US010768030B1

(12) United States Patent
Chang

(10) Patent No.: US 10,768,030 B1
(45) Date of Patent: Sep. 8, 2020

(54) PADDLE WHEEL FLOW METER

(71) Applicant: United Benefit Corp., New Taipei (TW)

(72) Inventor: Yuan Hse Chang, New Taipei (TW)

(73) Assignee: United Benefit Corp., New Taipei (TW)

( * ) Notice: Subject to any disclaimer, the term of this patent is extended or adjusted under 35 U.S.C. 154(b) by 0 days.

(21) Appl. No.: 16/508,160

(22) Filed: Jul. 10, 2019

(51) Int. Cl.
*G01F 1/06* (2006.01)
*G01F 1/075* (2006.01)

(52) U.S. Cl.
CPC .................................. *G01F 1/075* (2013.01)

(58) Field of Classification Search
None
See application file for complete search history.

(56) References Cited

U.S. PATENT DOCUMENTS

| | | | | |
|---|---|---|---|---|
| 3,731,533 A * | 5/1973 | Geery | ....................... | G01F 1/11 73/861.78 |
| 4,253,341 A * | 3/1981 | Ikeda | .................. | G01F 15/0755 73/861.77 |
| 4,379,411 A * | 4/1983 | Laviano | .................. | G01F 1/075 73/861.78 |
| 4,565,090 A * | 1/1986 | Gotanda | .................... | G01F 3/22 340/606 |
| 4,579,008 A * | 4/1986 | Bohm | ....................... | G01F 3/06 73/861.78 |
| 4,656,873 A * | 4/1987 | Stewart | ...................... | G01F 1/06 73/861.33 |
| 4,936,151 A * | 6/1990 | Tokio | ......................... | G01F 1/06 73/861.77 |
| 5,182,952 A * | 2/1993 | Pyzik | ......................... | G01F 1/06 73/861.79 |
| 5,259,251 A * | 11/1993 | Brinster | ................ | G01F 15/066 377/21 |
| 5,721,383 A * | 2/1998 | Franklin | .................. | G01F 1/075 73/861.77 |
| 5,939,644 A * | 8/1999 | Hsu | ......................... | G01F 1/075 73/861.77 |
| 5,945,608 A * | 8/1999 | Hutchinson | ............... | G01F 1/24 73/861.24 |
| 6,079,280 A * | 6/2000 | Miller | ........................ | G01F 1/06 416/223 R |
| 6,422,162 B1 * | 7/2002 | Nimberger | ............ | A01C 23/007 111/119 |
| 6,886,414 B2 * | 5/2005 | Gutierrez | ................. | G01F 3/10 73/861.78 |

(Continued)

*Primary Examiner* — Harshad R Patel
(74) *Attorney, Agent, or Firm* — Wang Law Firm, Inc.

(57) ABSTRACT

A paddle wheel flow meter includes a base, a paddle wheel, an axis and a magnetic sensor. The base is capable of being embedded in a fluid pipeline, and has two lugs. The paddle wheel is disposed between the two lugs, and includes paddles, two disc wheels, two bearings and at least a magnet, wherein the disc wheels are located at two opposite sides of the paddles, the bearings are respectively disposed in the disc wheels, the magnet is disposed in at least one of the disc wheels. The axis has two ends respectively fixed to the lugs through the bearings. The magnetic sensor is disposed in the base. When a fluid in the fluid pipeline drives the paddle wheel rotating, the magnetic sensor generates an electrical signal by sensing a magnetic field change of the magnet.

9 Claims, 20 Drawing Sheets

(56) References Cited

U.S. PATENT DOCUMENTS

| | | | | |
|---|---|---|---|---|
| 8,757,011 B2* | 6/2014 | Isicovich | ............... | G01F 1/075 73/861.88 |
| 2003/0193252 A1* | 10/2003 | Locke | ................ | F16C 32/0444 310/90.5 |
| 2004/0206174 A1* | 10/2004 | Gutierrez | ................. | G01F 3/10 73/261 |
| 2006/0090572 A1* | 5/2006 | Berkovitch | .............. | G01F 1/06 73/861.79 |
| 2010/0005903 A1* | 1/2010 | Beavis | ..................... | G01F 1/56 73/861.47 |
| 2014/0042859 A1* | 2/2014 | Wang | .................... | H02K 21/24 310/156.32 |

* cited by examiner

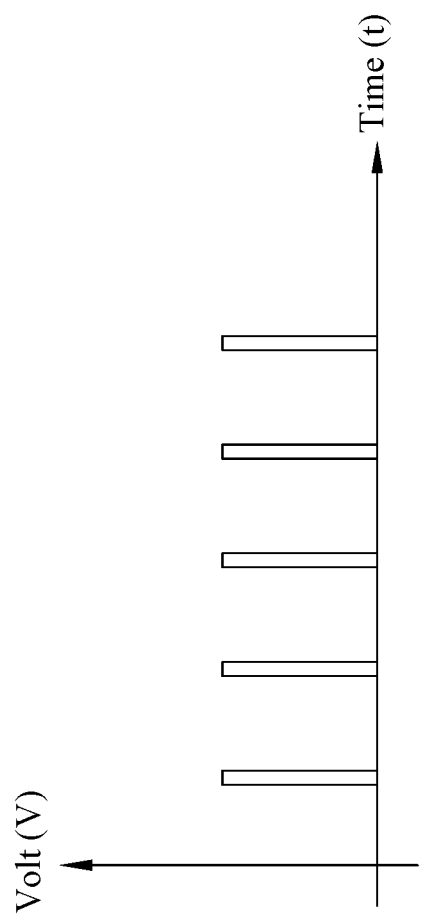

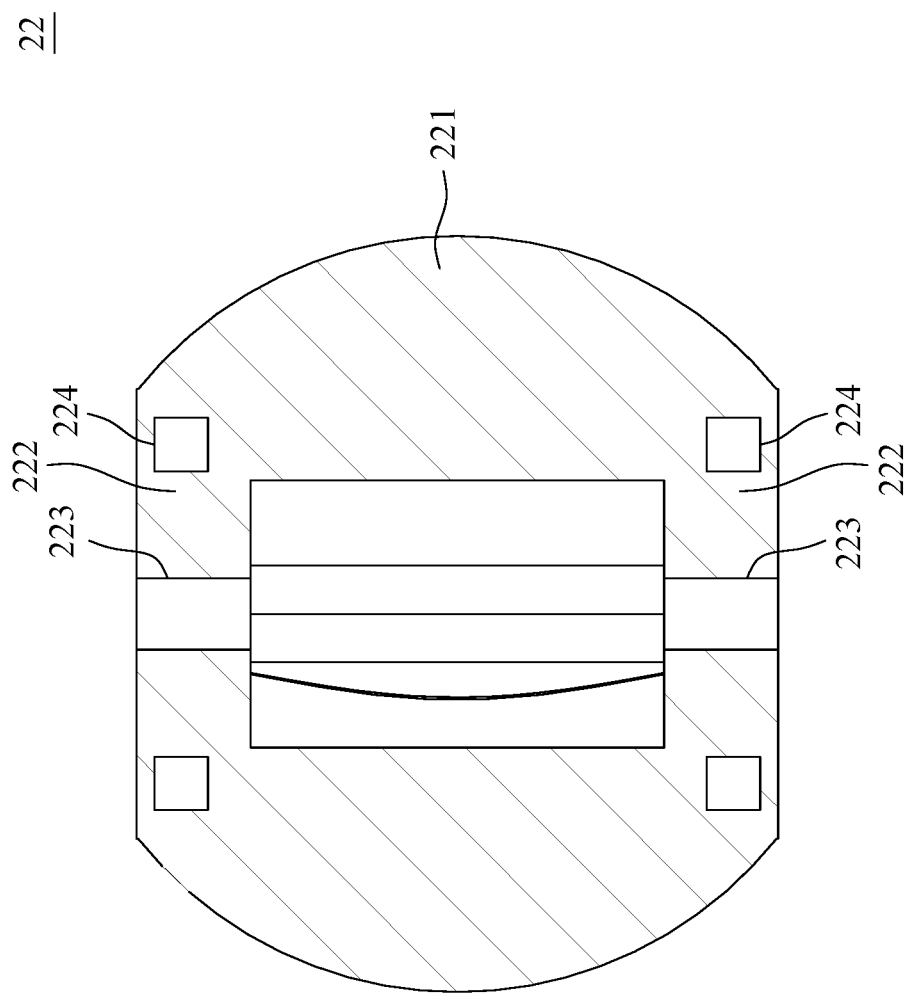

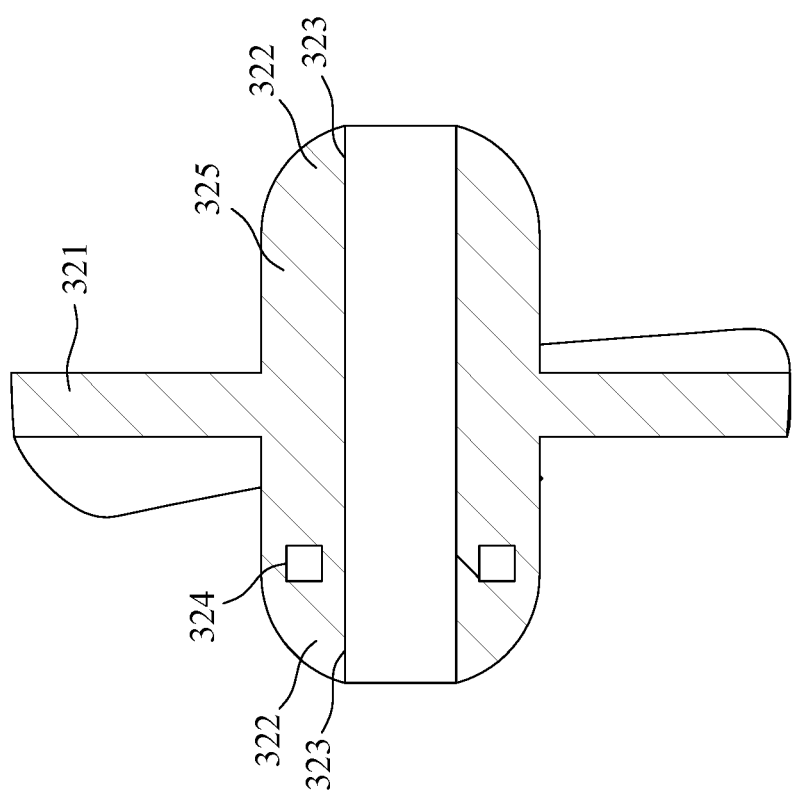

PADDLE WHEEL FLOW METER

BACKGROUND OF THE INVENTION

1. Field of the Invention

The present application relates to a flow meter, especially to a paddle wheel flow meter.

2. The Prior Arts

A paddle wheel flow meter which contacts with a fluid is mainly applied to measure a fluid flow containing less insoluble matter. The paddle wheel flow meter includes a case, a paddle wheel module and a sensing module, wherein the case has a part embedded in a pipeline, the paddle wheel module is disposed in the part of the case embedded in the pipeline, and the sensing module is disposed in the part of the case not embedded in the pipeline. The paddle wheel module includes two wheels, paddles and magnets, wherein the paddles connect to the wheels, and the magnets are disposed in the paddles. The sensing module includes a magnetic sensor and a signal processing circuit. When a fluid in the pipeline drives the paddle wheel module rotating, the magnets disposed in the paddles generates a magnetic field change, the magnetic sensor generates a pulse signal (as shown in FIG. 1) due to the magnetic field change, the signal processing circuit stored flow data corresponding to different frequencies of the pulse signal, and produces a fluid flow by interpolation of the flow data.

When the magnetic field change of the paddle wheel module driven by a low flowing rate of the fluid is too small, the sensing module is probably unable to generate the data of the fluid flow, or generates the fluid flow with great error. Due the magnetic sensor generates the pulse signal, the signal processing circuit cannot determine abnormal conditions of disengagement or wear of the paddle wheel. Moreover, a process of assembling the magnets and the paddles needs to consider relative positions thereof and the magnetic field change, the process is not only complicated, but easy to produce measurement error due to difference of the magnetic field generated by the individual paddles. Therefore, to solve the aforesaid problems, the paddle wheel flow meter is a main aspect of the present application.

SUMMARY OF THE INVENTION

To achieve the aforesaid aspect, the present application provides a paddle wheel flow meter including a base, a paddle wheel, an axis and a magnetic sensor. The base can be embedded in a fluid pipeline, and have two lugs. The paddle wheel is disposed between the lugs, and includes two disc wheels, two bearings and at least a magnet, wherein the disc wheels are located at opposite two sides of the paddles, the bearings are respectively disposed in the disc wheels, and the magnet is disposed in at least one of the disc wheels. The axis has two ends respectively fixed in the lugs through the bearings. The magnetic sensor is disposed in the base. When a fluid in the fluid pipeline drives the paddle wheel rotating, the magnetic sensor generates an electrical signal by sensing a magnetic field change of the magnet.

In an embodiment, the two sides of each paddle respectively connect to the disc wheels.

In an embodiment, adjacent two of the paddles are separated by an angle greater than 0 degree and less than 180 degree.

In an embodiment, the axis is perpendicular to a flowing direction of the fluid in the fluid pipeline.

In an embodiment, the axis is parallel to a flowing direction of the fluid in the fluid pipeline.

In an embodiment, the paddle wheel further includes an axial tube connecting to the disc wheels, a side of each paddle connects to a surface of the axial tube, and the axis passes through an interior of the axial tube.

In an embodiment, each paddle is a curved plate.

In an embodiment, number of the magnet is plural, and the magnets are respectively disposed in one or two of the disc wheels.

In an embodiment, the magnetic sensor is disposed in a region of the base between 0 and 90 degree from a surface of the magnet.

In an embodiment, the electrical signal is a continuous wave signal.

In the paddle wheel flow meter according to the present application, the paddle wheel includes two of the disc wheels located at the two sides of the paddles, and at least one of the disc wheel has the magnet disposed therein, so that the paddle wheel is easy to be manufactured and assembled; when the fluid in the fluid pipeline drives the paddle wheel rotating, the magnetic sensor disposed in the base generates the electrical signal of continuous wave according to the continuous magnetic field change generated by the magnet disposed in the disc wheel; thereby, the accurate fluid flow in the fluid pipeline can be obtained, and the abnormal conditions of the paddle wheel flow meter can be determined by the electrical signal.

BRIEF DESCRIPTION OF THE DRAWINGS

FIG. 1 schematically illustrates the pulse signal of the conventional paddle wheel flow meter;

FIG. 4D is an axially cross-sectional view schematically illustrating the paddle wheel shown in FIG. 4A;

FIG. 5D is an axially cross-sectional view schematically illustrating the paddle wheel shown in FIG. 5A;

DETAILED DESCRIPTION OF PREFERRED EMBODIMENTS

The technical features and other advantages of the present application will become more readily apparent to those ordinarily skilled in the art, by referring the following detailed description of embodiments of the present application in conjunction with the accompanying drawing. In order to further clarify the technical means adopted in the present application and the effects thereof, the figures schematically illustrate the relative relationship between the main elements, but is not based on the actual size; therefore, thickness, size, shape, arrangement and configuration of the main elements in the figure are only for reference, not intended to limit the scope of the present application.

Figure 2A:
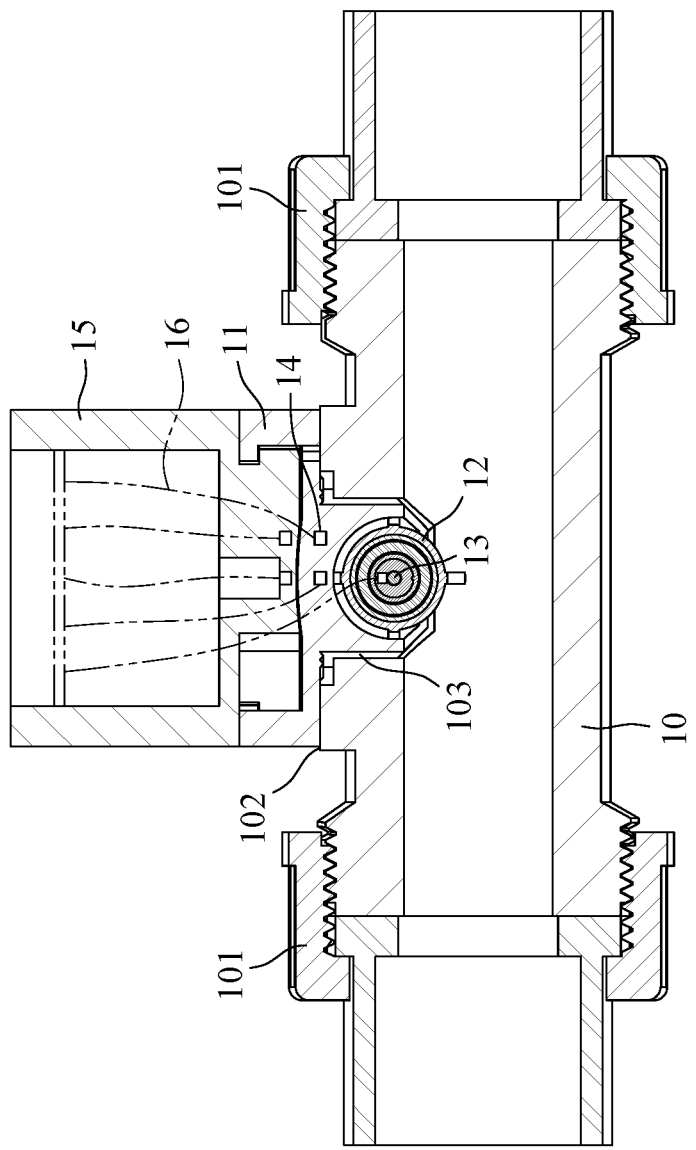
FIG. 2A is an axially cross-sectional view schematically illustrating the paddle wheel flow meter according to an embodiment of the present application.
Figure 2B:
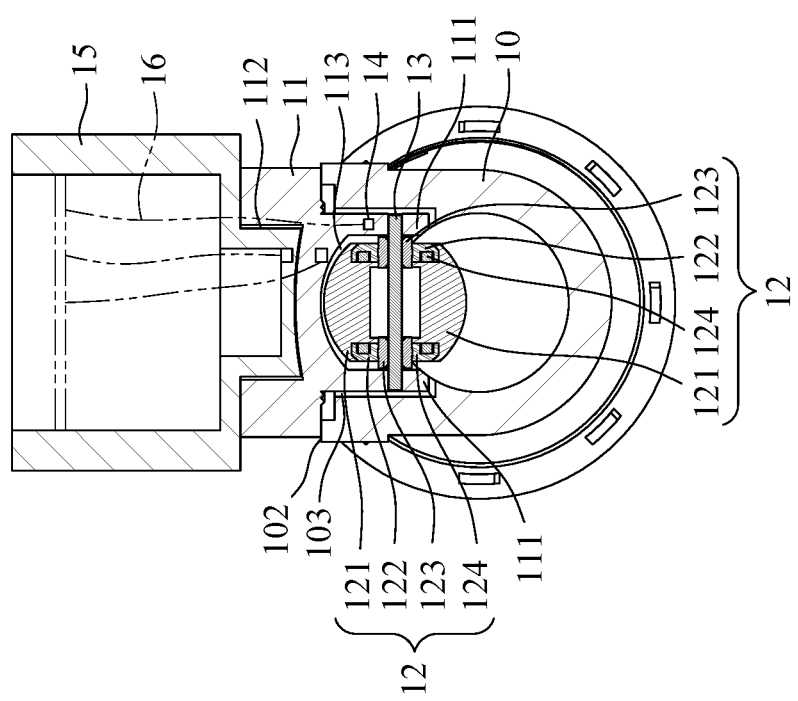
FIG. 2B is a radially cross-sectional view schematically illustrating the paddle wheel flow meter shown in FIG. 2A.

FIG. 2A is an axially cross-sectional view schematically illustrating the paddle wheel flow meter according to an embodiment of the present application, and FIG. 2B is a radially cross-sectional view schematically illustrating the paddle wheel flow meter shown in FIG. 2A. As shown in FIG. 2A and FIG. 2B, the paddle wheel flow meter 1 includes a base 11, a paddle wheel 12, an axis 13 and a magnetic sensor 14. The base 11 is capable of being embedded in a fluid pipeline 10, and has two lugs 111. The paddle wheel 12 is disposed between the two lugs 111, and includes plural paddles 121, two disc wheels 122, two bearings 123 and at least a magnet 124, wherein two of the disc wheels 122 are located at opposite two sides of the paddles 121, two of the bearings 123 are respectively disposed in two of the disc wheels 122, and the magnet 124 is disposed in one of the disc wheels 122. Two ends of the axis 13 are respectively fixed in two of the lugs 111 through two of the bearings 123. The magnetic sensor 14 is disposed in the base 11. When a fluid in the fluid pipeline 10 drives the paddle wheel 12 rotating, the magnetic sensor 14 generates an electrical signal by sensing a magnetic field change of the magnet 124.

In the paddle wheel flow meter 1 according to the present application, the base 11 and the axis 13 can be made of materials having chemical and physical stabilities, for example not limited to stainless steel, engineering plastics, etc.; the paddles 121 and the disc wheels 122 can be made of materials having chemical stability, for example not limited to engineering plastics; the bearings 123 can be made of materials of low friction, wear resistance and deformation resistance, for example not limited to engineering plastics, ceramics, etc.; and the magnet 124 can be made of ferromagnetic or alloy materials having high magnetic permeability. In an embodiment, a method of manufacturing the paddle wheel 12 includes following steps: coating the bearing 123 by injecting the engineering plastic to form two discs and the paddles 121, wherein the discs have annular grooves, and the paddles 121 connect to two of the discs; disposing the magnet 124 in the annular groove of the disc with an adhesive; coating two of the discs having the magnet 124 by injecting the engineering plastic to form the paddle wheel 12.

In this embodiment, two ends of the fluid pipeline 10 have threaded sleeves 101 capable of connecting to original pipeline of the fluid, a platform 102 and a socket 103 are formed on middle section of the fluid pipeline 10; a circuit slot 112 is formed on an upper side (opposite to the fluid pipeline 10) of the base 11, a hemispherical paddle wheel slot 113 is formed on lower side (towards the fluid pipeline 10) of the base 11, two of the lugs 111 are located at opposite two sides of the paddle wheel slot 113; the paddle wheel 12 is rotatably disposed in the paddle wheel slot 113 through the axis 13; in case that the axis 13 is perpendicular to an axial direction of the fluid pipeline 10 (i.e. a flowing direction of the fluid), the lugs 111 and the paddle wheel slot 113 are embedded in the socket 103 to make a slot wall of the circuit slot 112 lean on the platform 102, and the base 11 is fixed to the fluid pipeline 10 by using an adhesive or screws (not shown). To prevent the socket 103 from leakage of the fluid, an O-ring or water seal (not shown) can be further disposed between the socket 103 and the paddle wheel slot 113.

The paddle wheel flow meter according to the present application can transmit the electrical signal to an external electrical device or an internal functional circuit for calculating a flowing rate and the fluid flow. In this embodiment, the paddle wheel flow meter 1 further includes a data processor 15 disposed in the base 11 and electrically connecting to the magnetic sensor 14 through conductive wires 16, the data processor 15 includes an analog-to-digital convertor, a memory, a logic operation and the others functional circuits (not shown). The analog-to-digital convertor can convert an analog signal generated by the magnetic sensor 14 to a digital signal. The memory has stored size data of the pipelines, contrast data of the flowing rate, and a calculation program of the fluid flow. The logic operation circuit generates the fluid flow of the fluid pipeline 10 according to the digital signals generated by the analog-to-digital convertor, the contrast data of the flowing rate and the calculation program of the fluid flow.

Figure 3A:
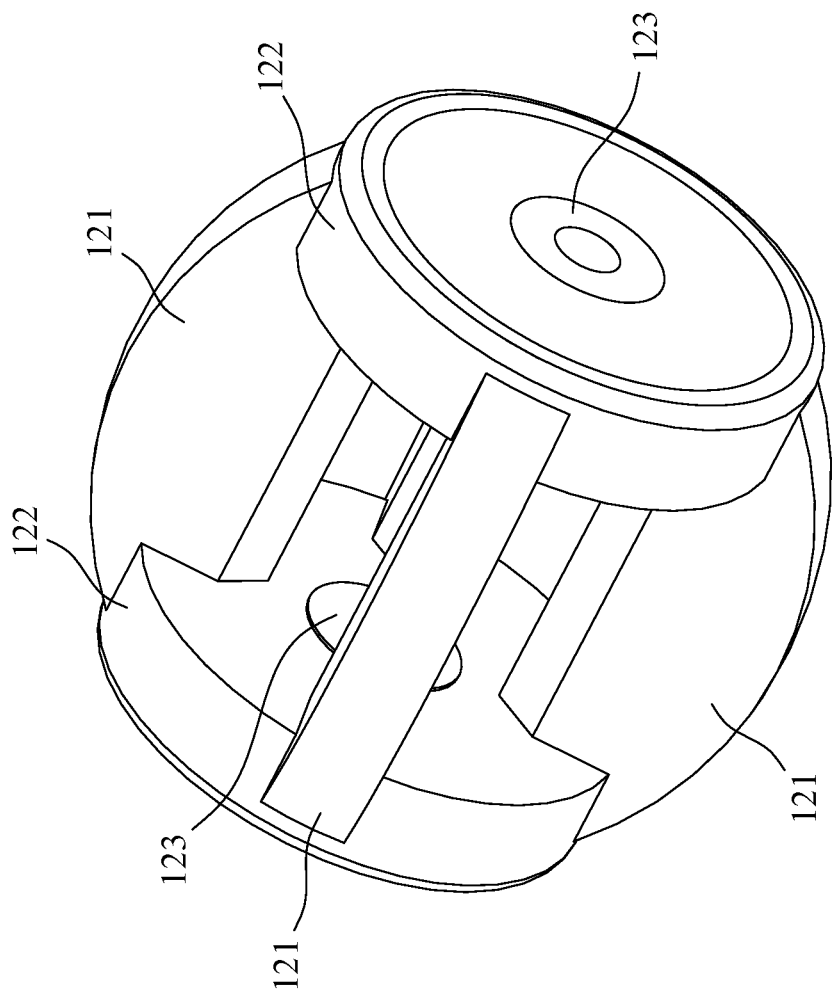
FIG. 3A is a three-dimensional view schematically illustrating the paddle wheel shown in FIG. 2A.
Figure 3B:
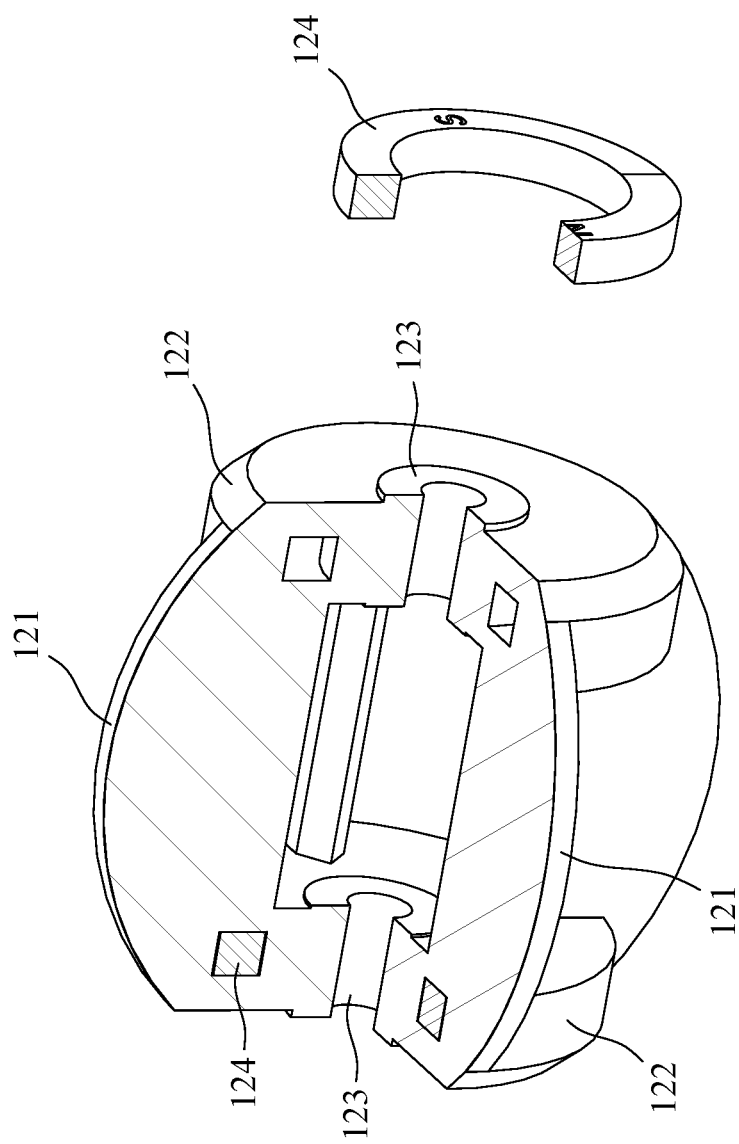
FIG. 3B is a cross-sectional view schematically illustrating a part of the paddle wheel shown in FIG. 3A.
Figure 3C:
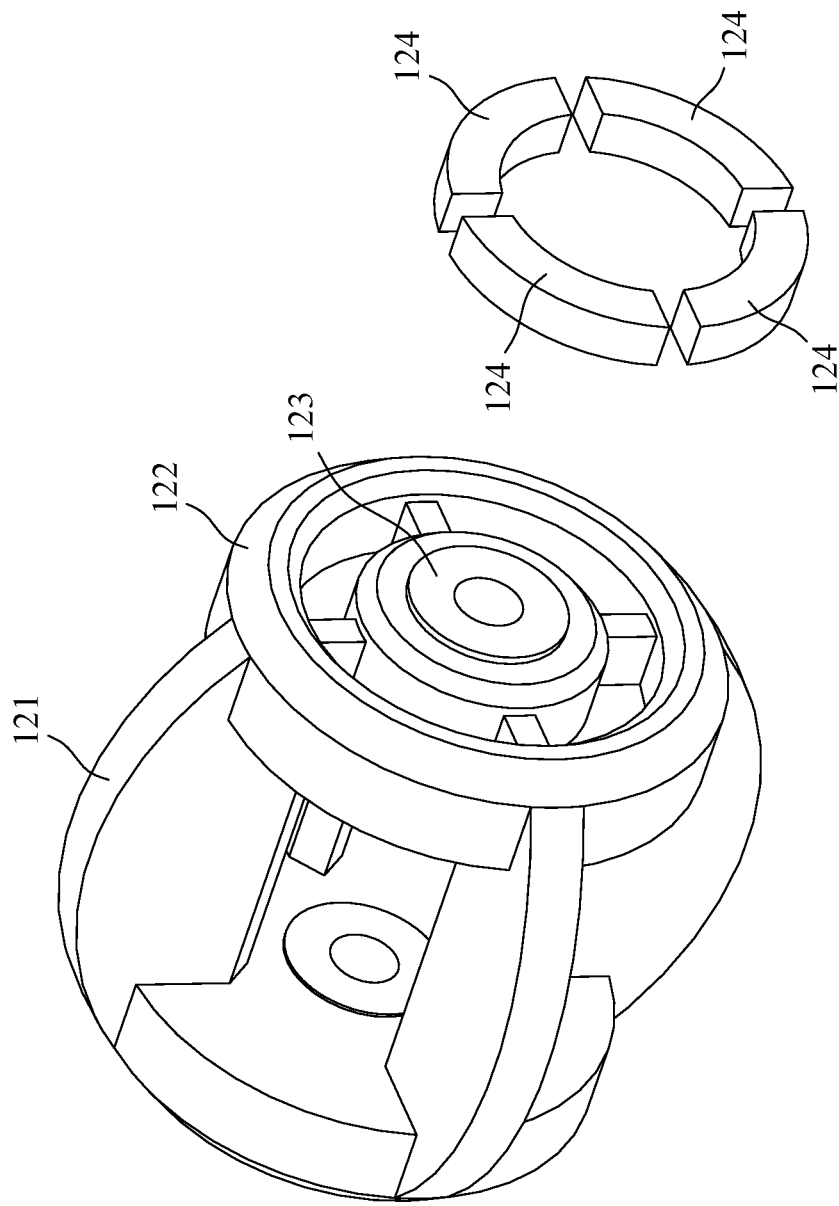
FIG. 3C is a three-dimensional view schematically illustrating the paddle wheel according another embodiment of the present application.

FIG. 3A is a three-dimensional view schematically illustrating the paddle wheel shown in FIG. 2A, and FIG. 3B is a cross-sectional view schematically illustrating a part of the paddle wheel shown in FIG. 3A. As shown in FIG. 3A and FIG. 3B, in this embodiment, the paddle wheel 12 includes two of the disc wheels 122, the paddles 121, the bearings 123 and the magnet 124. The number of paddles 121 is four, a shape of each paddle 121 is a semi-circular flat plate having two sides respectively connecting to two of the disc wheels 122. Each bearing 123 is disposed in the central region of the disc wheel 122. A shape of the magnet 124 is, for example not limited to, an arc, a circular, a rectangular, etc., two of the circular magnets 124 are respectively embedded in two of the disc wheels 122. The number of the magnets 124 disposed in the disc wheel has no particular limit, as shown in FIG. 3C schematically illustrating a three-dimensional view of the paddle wheel according another embodiment of the present application, the paddle wheel 12 includes two of the disc wheels 122, four of the paddles 121, two of the bearings 123 and four of the magnets 124. Each bearing 123 is disposed in the central region of the disc wheel 122. Four of the magnet grooves are formed in each disc wheel 122 between four of the paddles 121, and four of the magnets 124 in an annular arrangement are respectively disposed in the arc magnet grooves.

In the paddle wheel flow meter according to the present application, the paddles of different shapes, numbers and sizes can be selected according to the nature of the fluid. The shape of the paddles is, for example, a flat plat or a curved plate; the number of the paddles is, but not limited to, three, five, six, eight, nine or more, to allow adjacent two of the paddles be separated by an angle greater than 0 degree and less than 180 degree; and a maximum interference surface of each paddle in the flowing fluid is, but not limited to, a semicircle or a sector. Accordingly, the sensitivity of the paddle wheel to the flowing rate of different fluids can be ensured by selecting the paddles of different shapes, numbers and sizes.

Figure 3D:
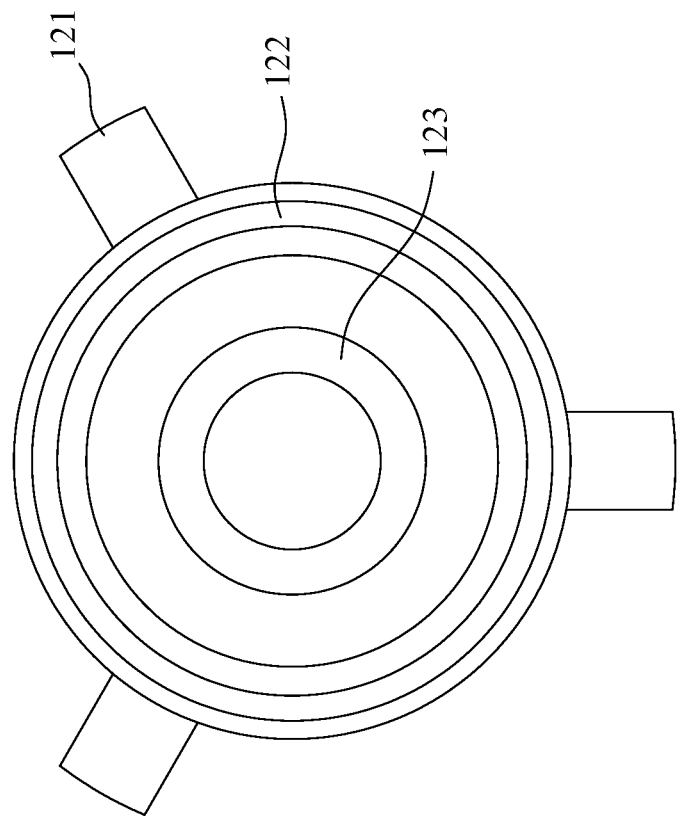
FIG. 3D is a radially cross-sectional view schematically illustrating the paddle wheel according to another embodiment of present application.
Figure 3E:
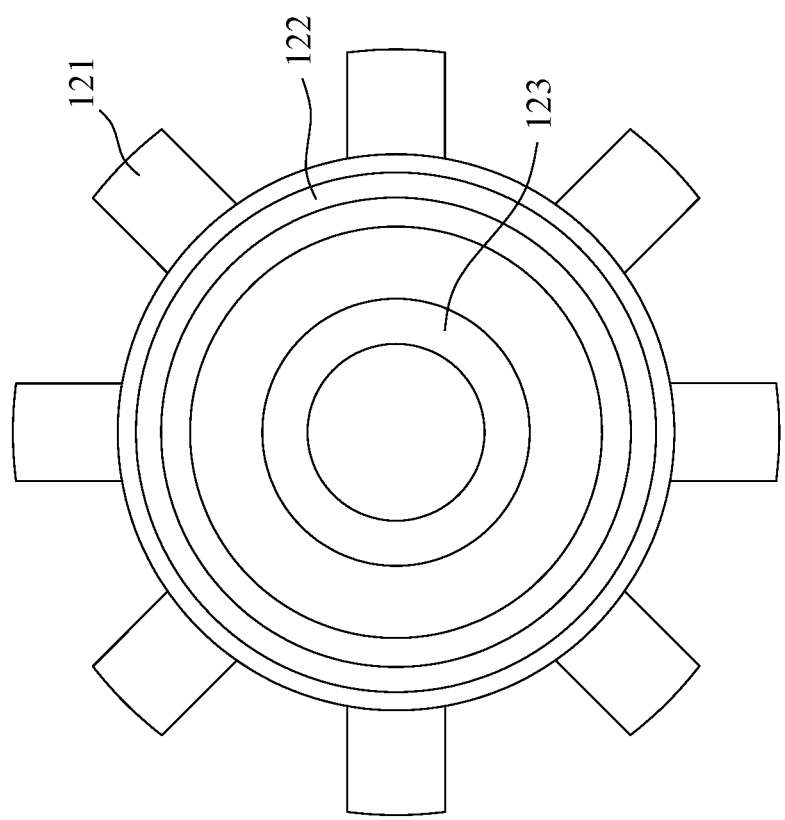
FIG. 3E is a radially cross-sectional view schematically illustrating the paddle wheel according to another embodiment of the present application.

FIG. 3D is a radially cross-sectional view schematically illustrating the paddle wheel according to another embodiment of present application, and FIG. 3E is a radially cross-sectional view schematically illustrating the paddle wheel according to another embodiment of the present application. As shown in FIG. 3D and FIG. 3E, the paddle wheel 12 includes two of the disc wheels 122, the paddles 121, the bearings 123 and the magnet (not shown), wherein the paddles 121 connect to two of the disc wheels 122, the bearings 123 is disposed in the central region of the disc wheels 122. The number of the paddles 121 are three (FIG. 3D) and eight (FIG. 3E) respectively, the shape of each paddle 121 is a flat plate, and to increase the number of the paddles 121 can make the rotating rate of the paddle wheel 12 more uniform.

Figure 4A:
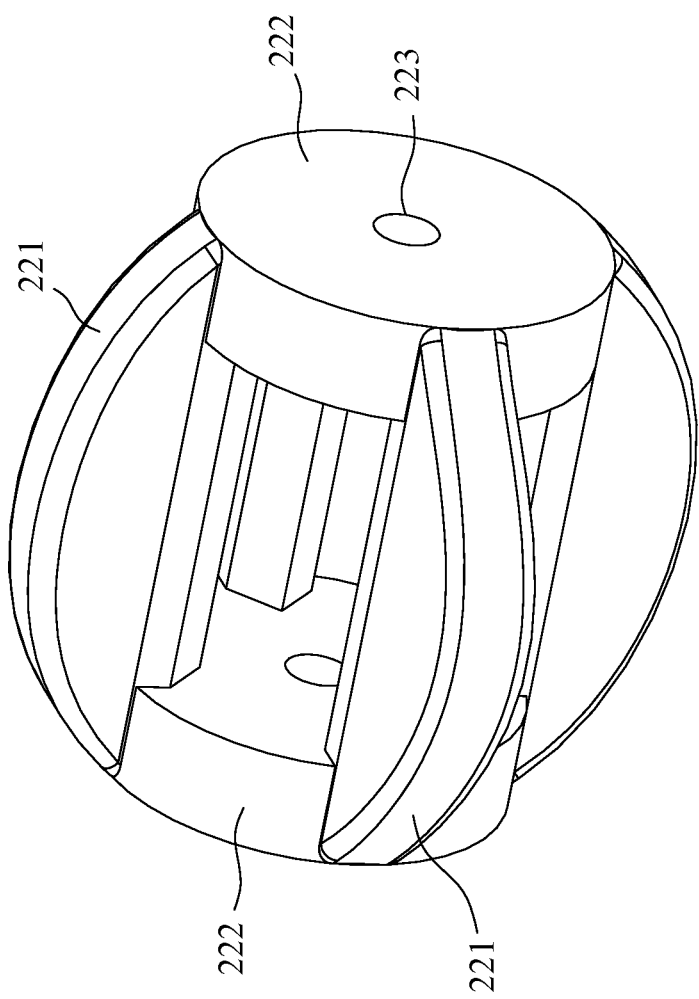
FIG. 4A is a three-dimensional view schematically illustrating the paddle wheel according another embodiment of the present application.
Figure 4B:
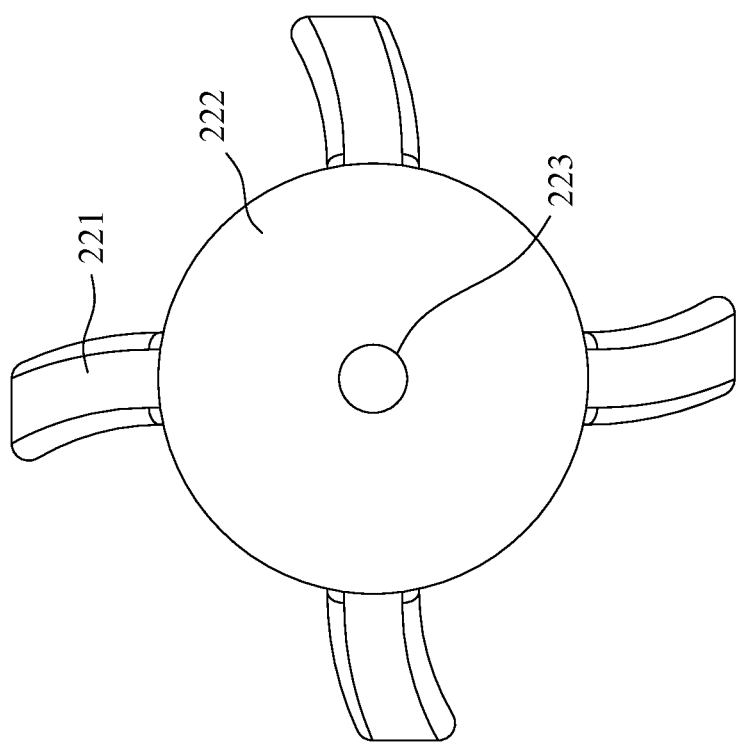
FIG. 4B is a radial side view schematically illustrating the paddle wheel shown in FIG. 4A.
Figure 4C:
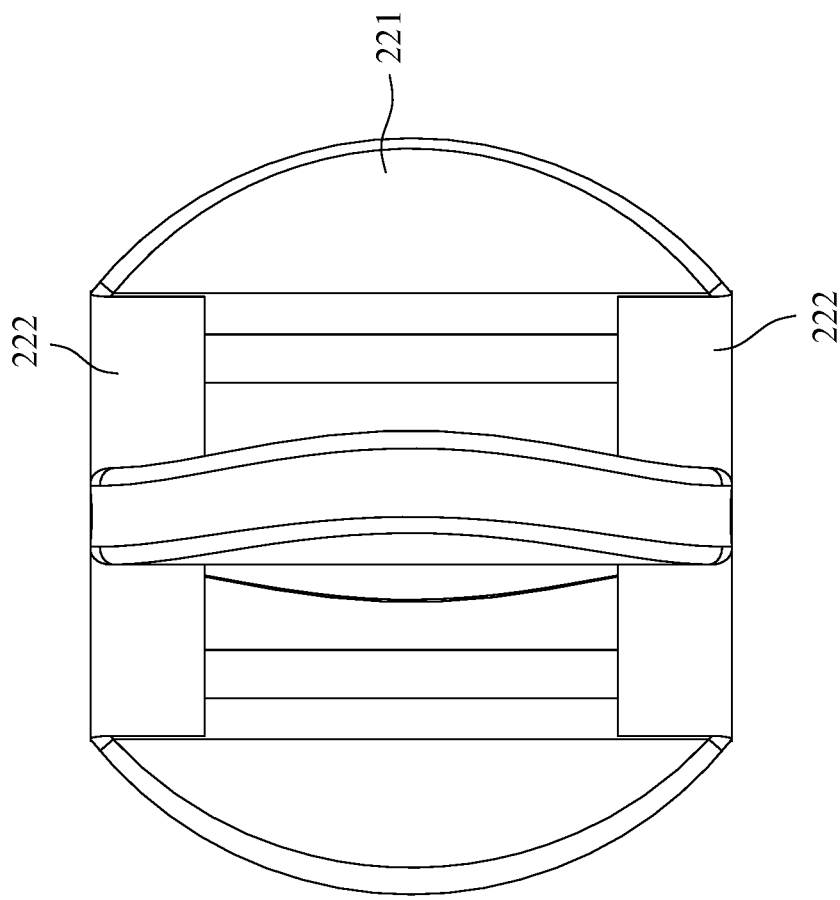
FIG. 4C is an axial side view schematically illustrating the paddle wheel shown in FIG. 4A.

FIG. 4A is a three-dimensional view schematically illustrating the paddle wheel according another embodiment of the present application, FIG. 4B is a radial side view schematically illustrating the paddle wheel shown in FIG. 4A, FIG. 4C is an axial side view schematically illustrating the paddle wheel shown in FIG. 4A, and FIG. 4D is an axially cross-sectional view schematically illustrating the paddle wheel shown in FIG. 4A. As shown in FIG. 4A, FIG. 4B, FIG. 4C and FIG. 4D, in this embodiment, the paddle wheel 22 includes the disc wheels 222, the paddles 221, the bearings 223 and the magnets 224. The shape of each paddle 221 is a curved semicircle plate having two sides respectively connecting to the disc wheels 222. The bearings 223 are respectively disposed in the central regions of the disc wheels 222. The magnets 224 are respectively embedded in the disc wheels 222. The paddles 221 of curved semicircle plate can increase the sensitivity of the paddle wheel 22 responding to the flowing rate of the fluid.

Figure 5A:
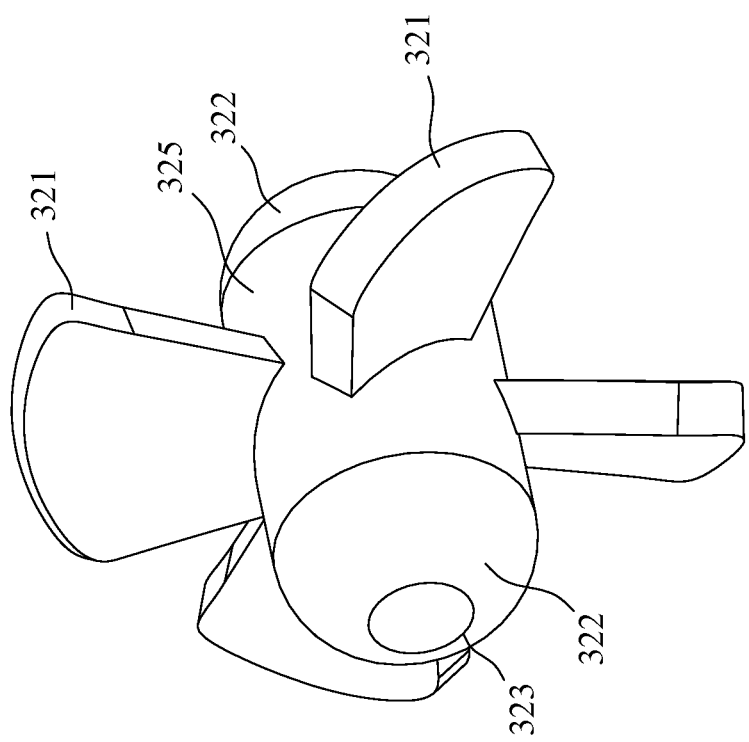
FIG. 5A is a three-dimensional view schematically illustrating the paddle wheel according to another embodiment of the present application.
Figure 5B:
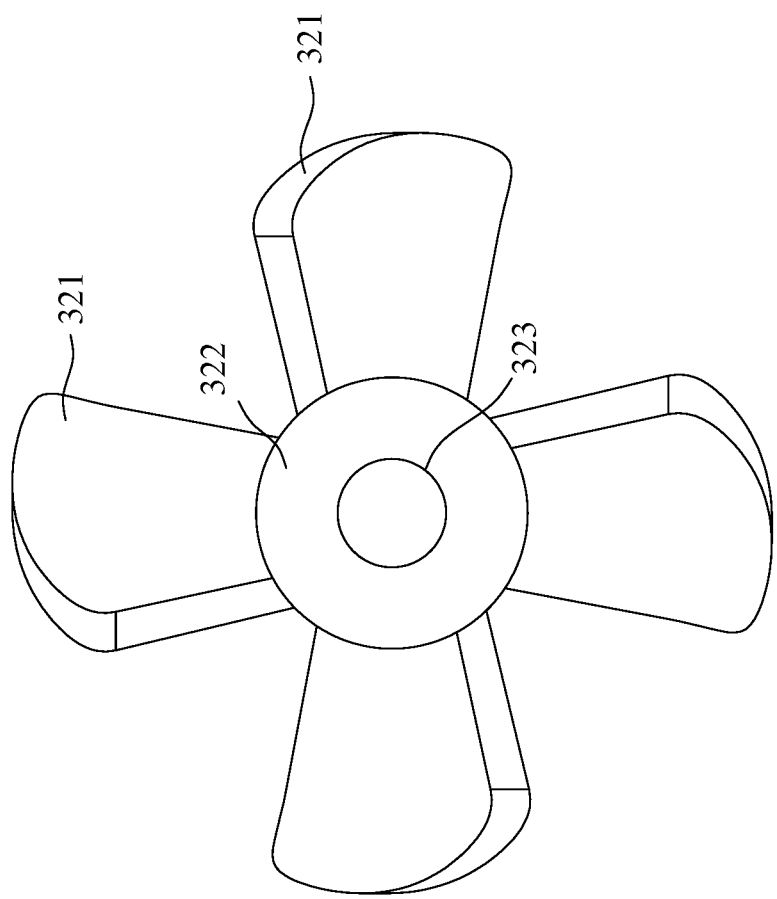
FIG. 5B is a radial side view schematically illustrating the paddle wheel shown in FIG. 5A.
Figure 5C:
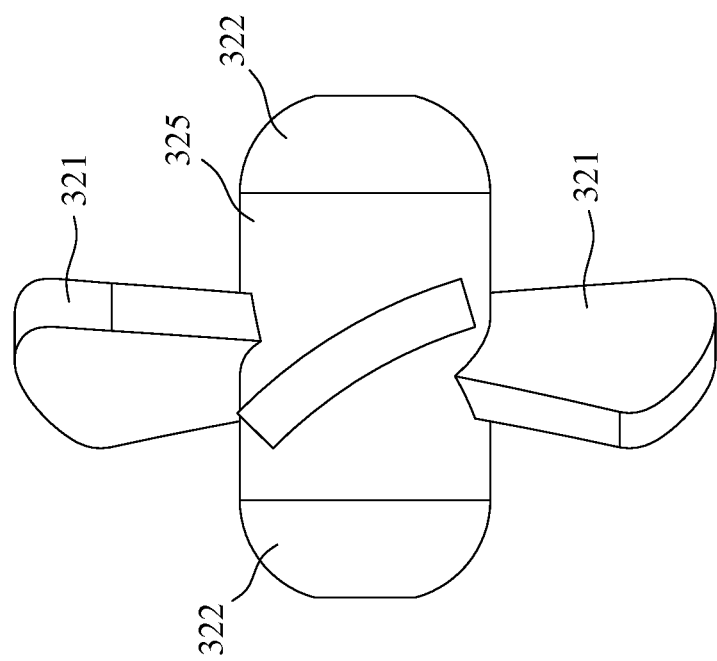
FIG. 5C is an axial side view of the paddle wheel shown in FIG. 5A.

FIG. 5A is a three-dimensional view schematically illustrating the paddle wheel according to another embodiment of the present application, FIG. 5B is a radial side view schematically illustrating the paddle wheel shown in FIG. 5A, FIG. 5C is an axial side view of the paddle wheel shown in FIG. 5A, and FIG. 5D is an axially cross-sectional view schematically illustrating the paddle wheel shown in FIG. 5A. As shown in FIG. 5A, FIG. 5B, FIG. 5C and FIG. 5D, the paddle wheel 32 includes four of the paddles 321, two of the disc wheels 322, two of the bearings 323, the magnets 324 and an axial tube 325. The axial tube 325 connects to the disc wheels 322. The shape of each paddle 321 is the curved sector plate having a side connecting to a surface of the axial tube 325. The bearings 323 are respectively disposed in the central regions of the disc wheels 322. The magnets 324 are embedded in the disc wheels 322. The axis (not shown) passes through an interior of the axial tube 325, and two ends of the axis are fixed to two of the lugs. With the axis parallel to the axial direction of the fluid pipeline, the disc wheels 322 are arranged along the flowing direction of the fluid to embed the paddle wheel 32 in the fluid pipeline. The paddles 321 of curved sector plate are less easy to be entangled or attached by strip impurities in the fluid, so as to reduce abnormal conditions and to increase service life of the paddle wheel 32.

Figure 6A:
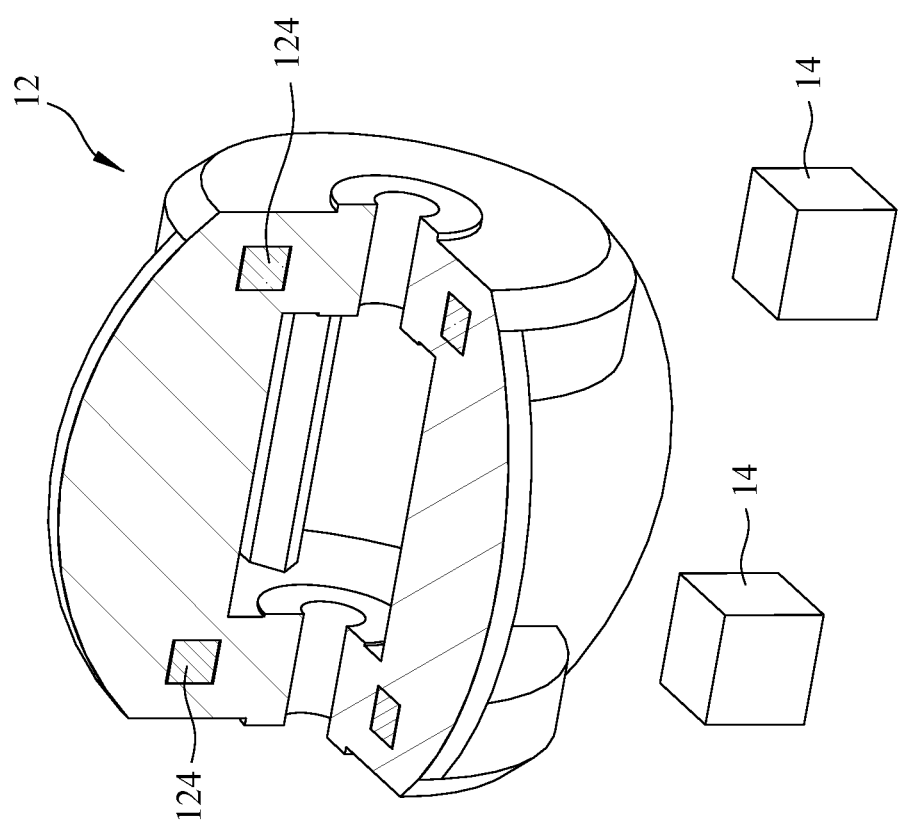
FIG. 6A schematically illustrates relative positions of the paddle wheel and the magnetic sensor according to an embodiment of the present application, and FIG. 6B schematically illustrates the relative positions of the paddle wheel and the magnetic sensor according to another embodiment of the present application.
Figure 6B:
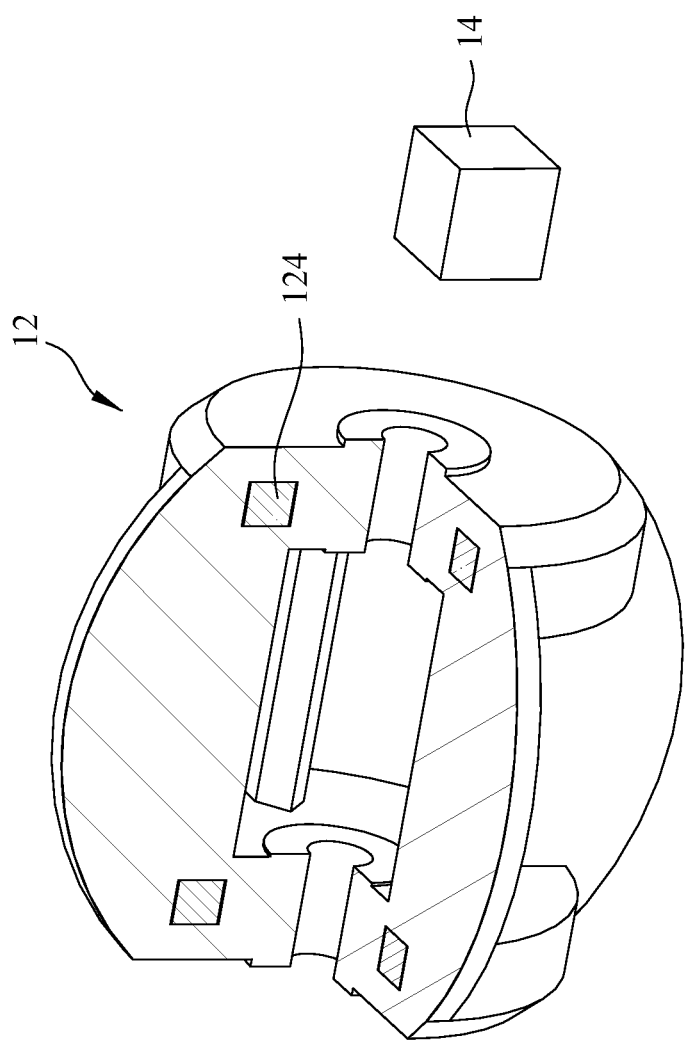

FIG. 6A schematically illustrates relative positions of the paddle wheel and the magnetic sensor according to an embodiment of the present application. As shown in FIG. 6A, in this embodiment, the magnetic sensor 14 is, for example not limited to, Magneto Resistive (MR), Hall, Fluxgate, differential electromagnetic coil, and other analog electromagnetic devices. The magnetic sensor 14 and the magnets 124 are separated by a distance, and the magnetic sensor 14 is disposed in a region of the base 11 parallel to the surface of the magnets 124. FIG. 6B schematically illustrating the relative positions of the paddle wheel and the magnetic sensor according to another embodiment of the present application. As shown in FIG. 6B, the magnetic sensor 14 is disposed in a region of the base 11 perpendicular to the surface of the magnet 124. In other embodiments, the magnetic sensor 14 can be disposed in a region of the base 11 between 0 and 90 degree from the surface of the magnet 124 (not shown). It is noted that more than one of the magnetic sensor 14 can be provided for sensing the magnetic field of the same magnet 124, as shown in FIG. 2B, two of the magnetic sensors 14 are respectively disposed in the regions of the base 11 parallel and perpendicular to the surface of the magnet 124.

The magnet in the paddle wheel generates continuous magnetic field change with the rotation of the disc wheel, the electrical signal S generated by the magnetic sensor sensing the magnetic field change is the analog signal of resistance (Ω), voltage (V) or current (A), and the electrical signal S represents a rotation angle (Θ) of the paddle wheel. The electrical signal S is transmitted to a computer program stored in the external electronic device or the internal data processor which corresponds to the paddle wheel flow meter according to the present application, the computer program obtains the data that represent an angular velocity (w) and revolution per minute (RPM) of the paddle wheel through differential operation of the electrical signal, and then the fluid flow can be obtained according to comparison data of different rotation speed range (e.g. a comparison curve below 4000 RPM or a comparison curve above 4000 RPM) and a cross-sectional area of inter diameter of the fluid pipeline.

Figure 7:
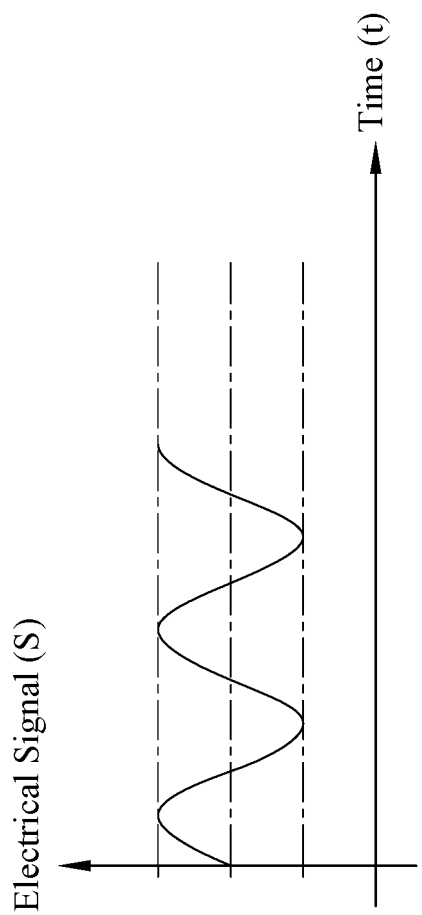
FIG. 7 schematically illustrates the electrical signal of the magnetic sensor according to an embodiment of the present application.

FIG. 7 schematically illustrates the electrical signal of the magnetic sensor according to an embodiment of the present application. As shown in FIG. 7, in this embodiment, the magnetic field of the magnet disposed in the disc wheel changes with the rotation of the paddle wheel, the magnetic sensor senses the magnetic field change to generate the electrical signal S of continuous wave (the analog signal of resistance, voltage or current), the external electronic device or the internal data processor can calculate the rotation angle, period and angular velocity of the paddle wheel according to the electrical signal S of the magnetic sensor, so that the fluid flow can be obtained. Disappearance of the electrical signal S represents that an abnormal condition of disengagement of the paddle wheel or interference of external magnetic field occurred; the electrical signal S out of normal range represents that an abnormal condition of wear of the axis or displacement of the magnet occurred; the external electronic device or the internal data processor stores the abnormal condition and an occurrence time thereof, and generates abnormal alarms corresponding to the different abnormal conditions, to notice users to exam the paddle wheel flow meter.

The sensing module of the conventional paddle wheel flow meter can only generate and transmit the pulse signal to the external monitoring device, the paddle wheel flow meter according to the present application can convert the electrical signal of continuous wave to simulated pulse signal that can be processed and utilized by the external monitoring device of the conventional paddle wheel flow meter.

Figure 8:
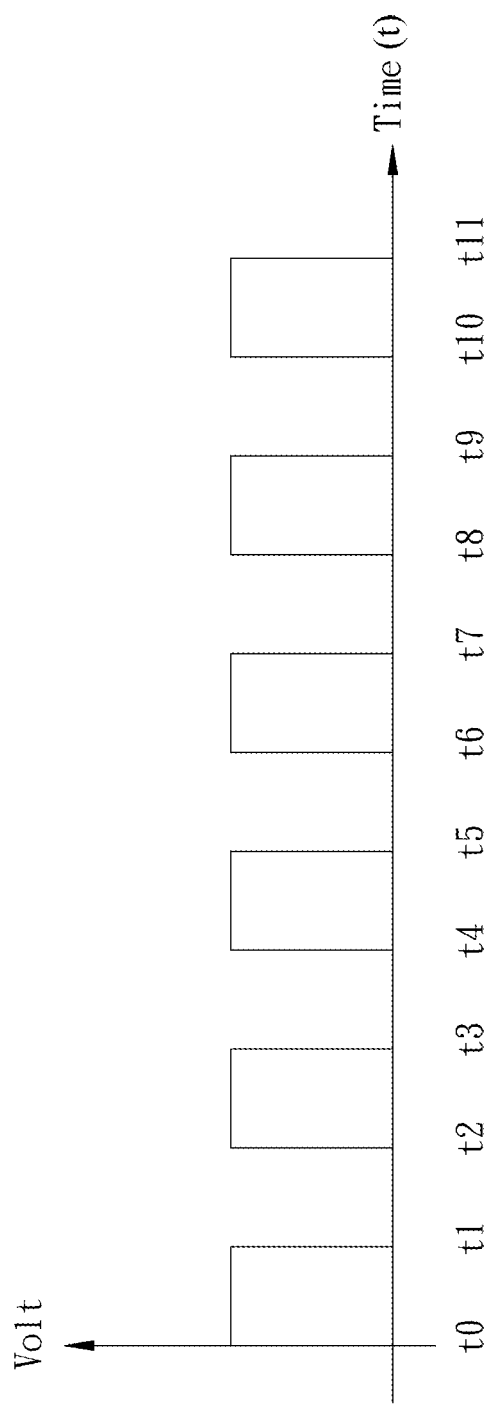
FIG. 8 schematically illustrates a simulated pulse signal of the paddle wheel flow meter according to another embodiment of the present application.

FIG. 8 schematically illustrates the simulated pulse signal of the paddle wheel flow meter according to another embodiment of the present application. As shown in FIG. 8, in this embodiment, the magnetic sensor generates the voltage signal of continuous wave between 2.4 and 3.6 volts (V), a high threshold 3.3 V and a low threshold 2.7 V are preset in the internal data processor; the internal data processor converts the electrical signals to the simulated pulse signals (the volts higher than 3.3 V converted to the simulated pulse signals at t0-t1, t4-t5, t8-t9; the volts lower than 2.7 V converted to the simulated pulse signals at t2-t3, t6-t7, t10-t11), converts the electrical signals of the volts between 3.3 V and low 2.7 V to zero, and sequentially transmits the simulated pulse signals to the monitoring device of the conventional paddle wheel flow meter, so that the paddle wheel flow meter according to the present application can be integrated with the monitoring device of the conventional paddle wheel flow meter without greatly modifying the computer program therein.

In the paddle wheel flow meter according to the present application, the paddle wheel includes two of the disc wheels located at the two sides of the paddles, and at least one of the disc wheel has the magnet disposed therein, so that the paddle wheel is easy to be manufactured and assembled; when the fluid in the fluid pipeline drives the paddle wheel rotating, the magnetic sensor disposed in the base generates the electrical signal of continuous wave according to the continuous magnetic field change generated by the magnet disposed in the disc wheel; thereby, the accurate fluid flow in the fluid pipeline can be obtained, and the abnormal conditions of the paddle wheel flow meter can be determined by the electrical signal.

The exemplary embodiments described above only illustrate the principles and effects of the present application, but are not intended to limit the scope of the present application. Based on the above description, an ordinarily skilled in the art can complete various similar modifications and arrangements according to the technical programs and ideas of the present application, and the scope of the appended claims of the present application should encompass all such modifications and arrangements.

What is claimed is:

1. A paddle wheel flow meter, comprising:
   a base, being capable of being embedded in a fluid pipeline, and having two lugs;
   a paddle wheel, disposed between the two lugs, comprising paddles, two disc wheels, two bearings and at least a magnet, wherein the disc wheels are located at two opposite sides of the paddles, the bearings are respectively disposed in the disc wheels, and the magnet is disposed in at least one of the disc wheels;
   an axis, having two ends respectively fixed to the lugs through the bearings; and
   a magnetic sensor, disposed in the base; and
   a data processor, connecting to the magnetic sensor;
   when a fluid in the fluid pipeline drives the paddle wheel rotating, the magnetic sensor generates a continuous wave signal by sensing a magnetic field change of the magnet, the data processor calculates an angular velocity of the paddle wheel according to the continuous wave signal, and determines abnormal conditions of the paddle wheel flow meter on the continuous wave signal out of a normal range.

2. The paddle wheel flow meter according to claim 1, wherein the two sides of each paddle respectively connect to the disc wheels.

3. The paddle wheel flow meter according to claim 1, wherein adjacent two of the paddles are separated by an angle greater than 0 degree and less than 180 degree.

4. The paddle wheel flow meter according to claim 1, wherein the axis is perpendicular to a flowing direction of the fluid in the fluid pipeline.

5. The paddle wheel flow meter according to claim 1, wherein the axis is parallel to a flowing direction of the fluid in the fluid pipeline.

6. The paddle wheel flow meter according to claim 1, wherein the paddle wheel further comprises an axial tube connecting to the disc wheels, a side of each paddle connects to a surface of the axial tube, and the axis passes through an interior of the axial tube.

7. The paddle wheel flow meter according to claim 1, wherein each paddle is a curved plate.

8. The paddle wheel flow meter according to claim 1, wherein the number of the magnet is plural, and the magnets are respectively disposed in one or two of the disc wheels.

9. The paddle wheel flow meter according to claim 1, wherein the magnetic sensor is disposed in a region of the base between 0 and 90 degree from a surface of the magnet.

* * * * *